United States Patent
Yang et al.

(10) Patent No.: US 8,797,217 B2
(45) Date of Patent: Aug. 5, 2014

(54) MOBILE WIRELESS COMMUNICATIONS DEVICE INCLUDING ANTENNA ASSEMBLY HAVING SPACED APART PARALLEL CONDUCTOR ARMS AND RELATED METHODS

(75) Inventors: Shing Lung Steven Yang, Schaumburg, IL (US); Firass Mirza Badaruzzaman, Oak Park, IL (US); Brian Francisco Rojas, Chicago, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 455 days.

(21) Appl. No.: 13/112,202

(22) Filed: May 20, 2011

(65) Prior Publication Data

US 2012/0293368 A1 Nov. 22, 2012

(51) Int. Cl.
*H01Q 1/24* (2006.01)
(52) U.S. Cl.
USPC .......................................................... 343/702
(58) Field of Classification Search
USPC .......................................... 343/702, 700 MS
See application file for complete search history.

(56) References Cited

U.S. PATENT DOCUMENTS

| | | | |
|---|---|---|---|
| 4,864,318 A | 9/1989 | Iwasaki et al. | 343/702 |
| 5,600,339 A | 2/1997 | Oros | 343/825 |
| 6,313,801 B1 * | 11/2001 | Sanford et al. | 343/725 |
| 7,148,846 B2 * | 12/2006 | Qi et al. | 343/700 MS |
| 7,796,088 B1 | 9/2010 | Chen et al. | 343/872 |
| 8,368,613 B2 * | 2/2013 | Hornung | 343/906 |
| 2004/0090372 A1 | 5/2004 | Nallo et al. | 343/700 MS |
| 2005/0162321 A1 | 7/2005 | Colburn et al. | 343/702 |
| 2007/0152881 A1 | 7/2007 | Chan | 343/700 |
| 2009/0295653 A1 * | 12/2009 | Komura | 343/702 |

FOREIGN PATENT DOCUMENTS

| | | | | |
|---|---|---|---|---|
| JP | 2008160319 | 7/2008 | | H01Q 5/01 |
| WO | 00/36700 | 6/2000 | | H01Q 1/24 |
| WO | 2008/009391 | 1/2008 | | H01Q 1/24 |

\* cited by examiner

*Primary Examiner* — Seung Lee
(74) *Attorney, Agent, or Firm* — Allen, Dyer, Doppelt, Milbrath & Gilchrist, P.A.

(57) ABSTRACT

A mobile wireless communications device may include a portable housing, at least one wireless transceiver carried by the portable housing, and at least one satellite positioning signal receiver carried by the portable housing. The mobile wireless communications device may also include an antenna assembly carried by the portable housing. The antenna assembly may include a base electrical conductor having a pair of antenna feed points defined therein and coupled to the at least one wireless transceiver and the at least one satellite signal positioning receiver. The antenna assembly may also include first and second conductor arms being spaced apart, parallel, and extending outwardly from the base electrical conductor.

21 Claims, 8 Drawing Sheets

MOBILE WIRELESS COMMUNICATIONS DEVICE INCLUDING ANTENNA ASSEMBLY HAVING SPACED APART PARALLEL CONDUCTOR ARMS AND RELATED METHODS

TECHNICAL FIELD

The present disclosure generally relates to the field of wireless communications systems, and, more particularly, to mobile wireless communications devices and related methods.

BACKGROUND

Mobile wireless communications systems continue to grow in popularity and have become an integral part of both personal and business communications. For example, cellular telephones allow users to place and receive voice calls almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing antennas that provide desired operating characteristics within the relatively limited amount of space available for antennas.

DETAILED DESCRIPTION

Figure 1:
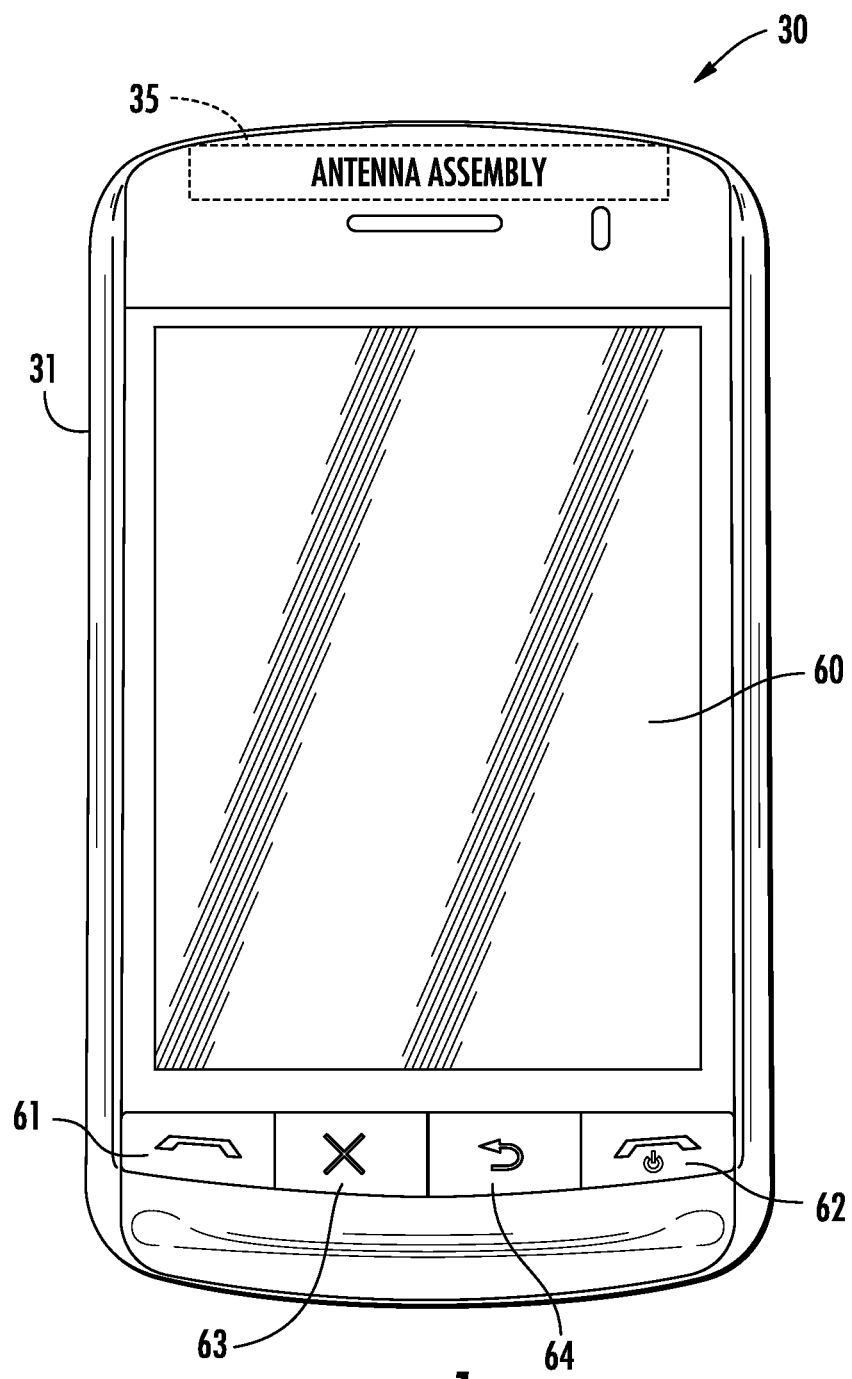
FIG. 1 is a top plan view of a mobile wireless communications device including an antenna assembly in accordance with one example embodiment.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

In accordance with one exemplary aspect, a mobile wireless communications device may include a portable housing, at least one wireless transceiver carried by the portable housing, and at least one satellite positioning signal receiver carried by the portable housing. The mobile wireless communications device may also include an antenna assembly carried by the portable housing, for example. The antenna assembly may include a base electrical conductor having a pair of antenna feed points defined therein and coupled to the at least one wireless transceiver and the at least one satellite signal positioning receiver. The antenna assembly may also include first and second conductor arms being spaced apart, parallel, and extending outwardly from the base electrical conductor, for example.

The antenna assembly may further include a dielectric substrate supporting the base electrical conductor and the first and second conductor arms. The dielectric substrate may include a flexible dielectric substrate, for example. The mobile wireless communications device may further include at least one electronic component carried by the dielectric substrate.

The first and second conductor arms each have a same length, for example. The first and second conductor arms may have a rectangular shape.

The pair of antenna feed points may include a pair of shorted antenna feed points, for example. The mobile wireless communications device may further include an impedance matching circuit carried by the housing and coupled to the antenna assembly. The antenna assembly may be configured to operate in at least one of a global positioning system (GPS) band, a wireless local area network (WLAN) band, and a personal area network (PAN) band.

Another example aspect is directed to a mobile wireless communications device that may include a portable housing, at least one wireless transceiver carried by the portable housing, and an antenna assembly carried by the portable housing, for example. The antenna assembly may include a base electrical conductor having a slot therein defining pair of antenna feed points and coupled to the at least one wireless transceiver. The antenna assembly may further include first and second conductor arms being spaced apart, parallel, and extending outwardly from the base electrical conductor, the first and second conductor arms being angled with respect to the slot.

A method aspect is directed to a method of making an antenna assembly for a mobile wireless communications device that may include a portable housing, at least one wireless transceiver carried by the portable housing, and at least one satellite positioning signal receiver carried by the portable housing. The method may include forming a base electrical conductor having a pair of antenna feed points and to be coupled to the at least one wireless transceiver, and the at least one satellite positioning signal receiver. The method may also include forming first and second parallel conductor arms being spaced apart, parallel, and extending outwardly from the base electrical conductor.

Another method aspect is direct to a method of forming a mobile wireless communications device including a portable housing, at least one wireless transceiver carried by the portable housing, and an antenna assembly carried by the portable housing. The method may include forming a base electrical conductor having a slot therein defining pair of antenna feed points and coupled to the at least one wireless transceiver, for example. The method may also include forming first and second conductor arms being spaced apart, parallel, and extending outwardly from the base electrical conductor, the first and second conductor arms being angled with respect to the slot.

Figure 2:
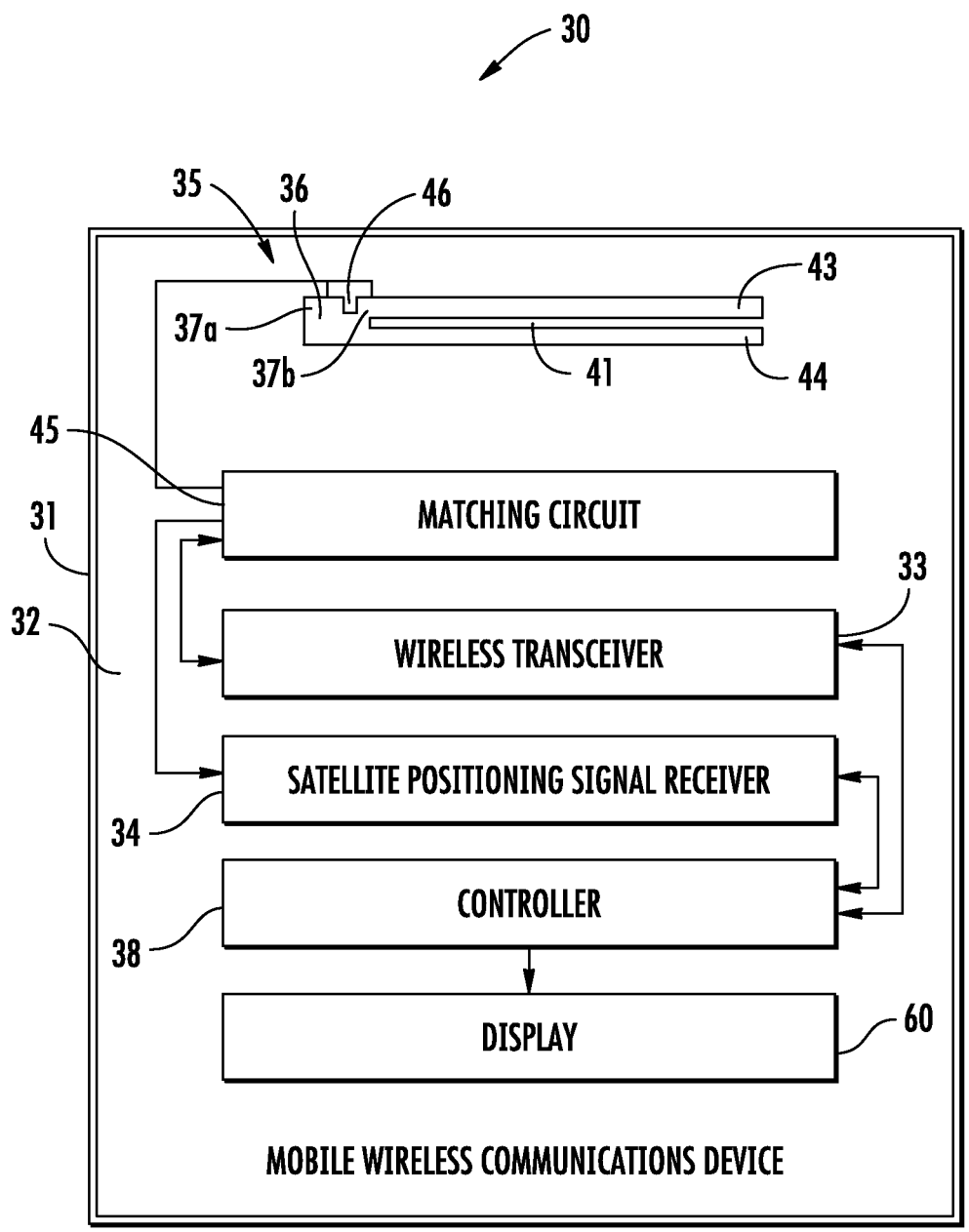
FIG. 2 is a schematic block diagram of the device of FIG. 1.
Figure 3:
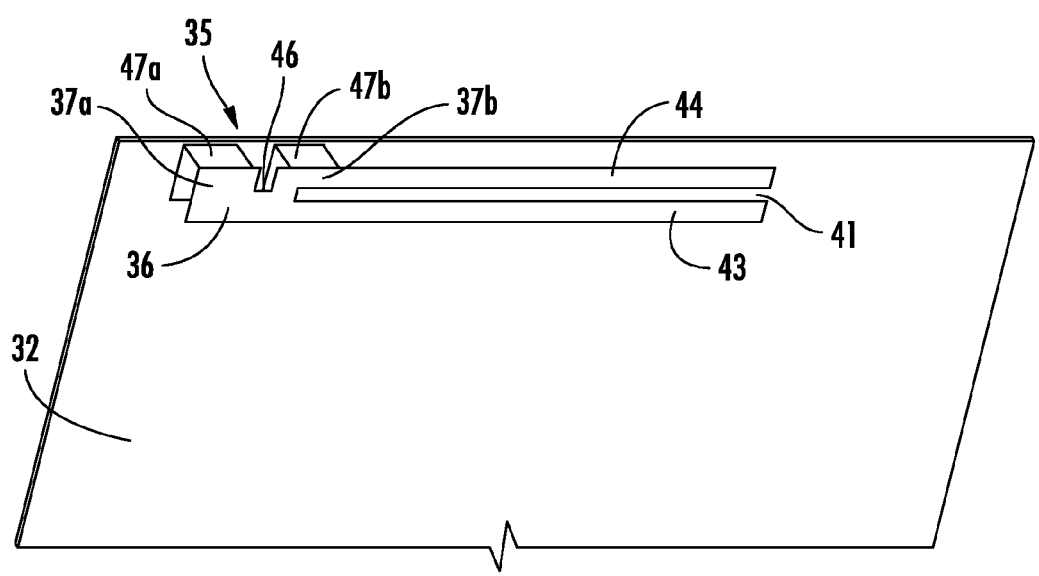
FIG. 3 is a perspective view of a portion of the substrate of the device in FIG. 2 including the antenna.

Referring initially to FIGS. 1-3, a mobile wireless communications device 30 illustratively includes a portable housing 31 and a dielectric substrate 32, for example, a printed circuit board (PCB), carried by the portable housing. The portable housing 31 has an upper portion and a lower portion. A wireless transceiver 33 is carried by the portable housing 31. In some embodiments, not shown, the dielectric substrate 32 may be replaced by or used in conjunction with a metal chassis or other substrate. The dielectric substrate 32 may also include a conductive layer (not shown) defining a ground plane.

A satellite positioning signal receiver 34 is also carried by the portable housing 31. The satellite positioning signal receiver 34 may be a Global Positioning System (GPS) satellite receiver, for example.

The exemplary device 30 further illustratively includes a display 60 and a plurality of control keys including an "off hook" (i.e., initiate phone call) key 61, an "on hook" (i.e., discontinue phone call) key 62, a menu key 63, and a return or escape key 64. Operation of the various device components and input keys, etc., will be described further below with reference to FIG. 8.

The device 30 further illustratively includes an antenna assembly 35 carried adjacent the upper portion of the portable housing 31. The antenna assembly 35 is advantageously a two-arm planar inverted F-antenna (PIFA) that may be tuned to different frequency bands, for example. The antenna assembly 35 illustratively includes a base electrical conductor 36 supported by the dielectric substrate 32. The base electrical conductor 36 has a pair of shorted antenna feed points 37a, 37b defined therein by a base electrical conductor slot 46. The pair of shorted antenna feed points 37a, 37b may not be defined by the base electrical conductor slot 38, for example. In other words, the base electrical conductor 37 may not include the base electrical conductor slot 46. The base electrical conductor slot 46 advantageously tunes the impedance of the antenna assembly 35. The shorted antenna feed points 37a, 37b, are coupled to the wireless transceiver 33 and the satellite positioning receiver 34. In some embodiments, the antenna feed points 37a, 37b may not be shorted. The first and second conductive feeds 47a, 47b may be coupled between the shorted feed points 37a, 37b and the dielectric substrate 32 to space the antenna assembly above the dielectric substrate 32 (FIG. 3).

The antenna assembly 35 also includes first and second conductor arms 43, 44 extending outwardly from the base electrical conductor 36 and supported by the dielectric substrate 32. The first and second conductor arms 43, 44 are illustratively rectangular in shape and spaced apart and parallel. In other words, the first and second conductor 43, 44 arms may resemble a tuning fork. The first and second conductor arms 43, 44 may be other shapes.

As will be appreciated by those skilled in the art, the length of the first and second conductor arms 43, 44 may be tuned to excite the common mode. The first and second arms have an equal length so that they may be tuned to resonate at 1.575 GHz, which is advantageously in the GPS frequency band. Of course, the length of the first and second conductor arms 43, 44 may be different and may be tuned to resonate at another frequency within another frequency band.

The length of the slot 41, or space between the first and second conductor arms 43, 44 advantageously may be tuned to excite the slot mode. For example, the length of the slot 41 may be tuned to resonate at 2.4 GHz, which is advantageously in the wireless local/personal area network (WLAN/PAN), Bluetooth, WiFi frequency band. Of course, the length of the slot 41 may be tuned to resonate at another frequency within another frequency band.

A matching circuit 45 may be carried by the housing 31 and/or dielectric substrate 32, and coupled to the antenna assembly 35. The matching circuit 45 may further improve impedance matching of the antenna assembly 35, as will be appreciated by those skilled in the art. Other or additional circuitry or electric components may also be carried by the housing 31 and/or dielectric substrate 32.

A controller 38 or processor may also be carried by the PCB 32. The controller 38 may cooperate with the other components, for example, the antenna assembly 35, the satellite positioning signal receiver 34, and the wireless transceiver 33 to coordinate and control operations of the mobile wireless communications device 30. Operations may include mobile voice and data operations, including email and Internet data.

Figure 4A:
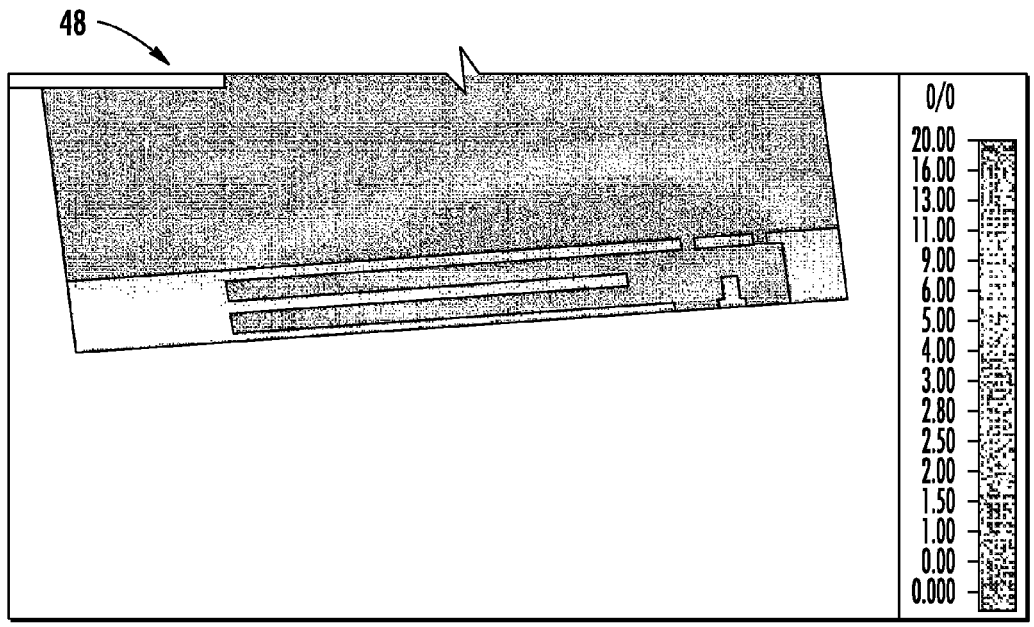
FIG. 4a is a simulated current distribution graph for the antenna assembly of FIG. 2 for the common mode.
Figure 4B:
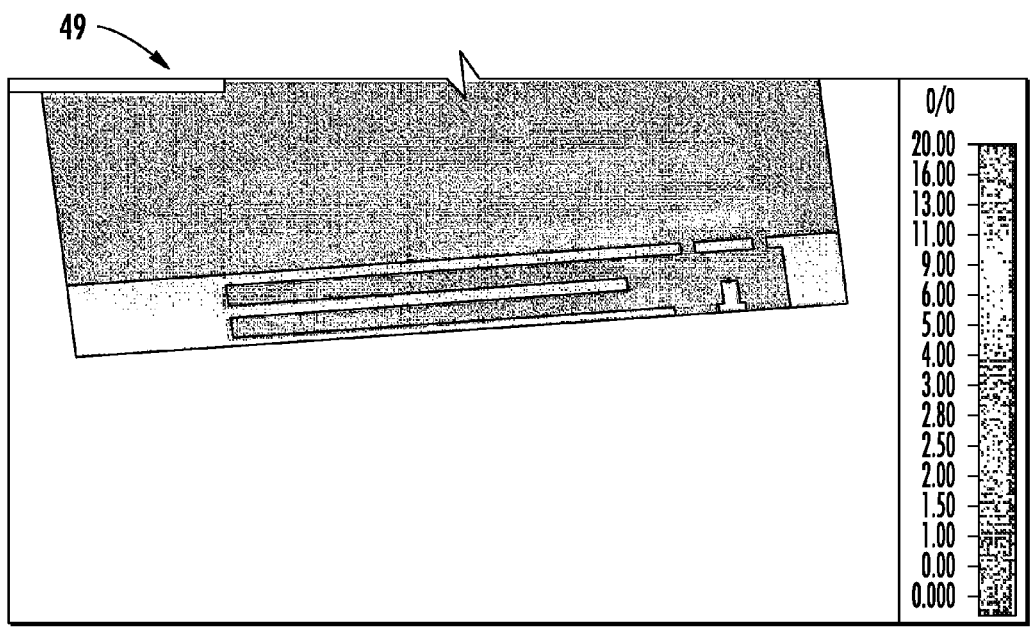
FIG. 4b is a simulated current distribution graph for the antenna assembly of FIG. 2 for the slot mode.

Referring now the graphs 48, 49 in FIGS. 4a and 4b, respectively, the simulated surface currents for the antenna assembly 35 illustrated in FIGS. 2 and 3 are illustrated. More particularly, the graph 48 in FIG. 4a illustrates the surface current for the antenna assembly 35 operating in the common mode at 1.575 GHz. The graph 49 in FIG. 4b illustrates the surface current for the antenna assembly 35 operating in the slot mode at 2.45 GHz.

Figure 5:
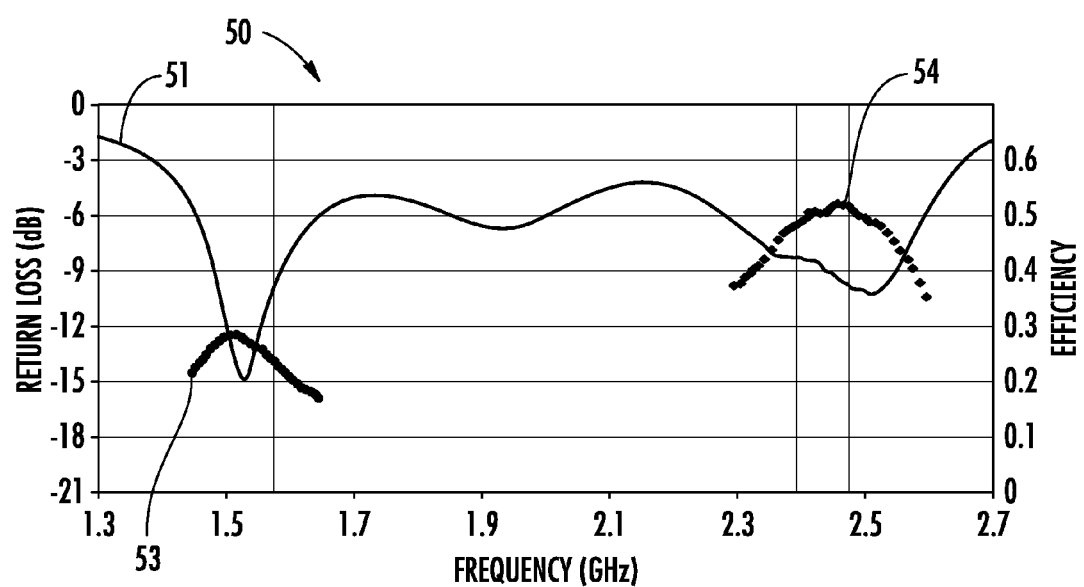
FIG. 5 is a graph of measured return loss and efficiency for an antenna assembly similar to FIG. 2.

Referring now to the graph 50 FIG. 5, measured performance in free space for an antenna assembly similar to the antenna assembly 35 illustrated in FIGS. 2 and 3 and having a shorted trace with the matching circuit 45 is illustrated. The measured performance is illustratively measured by return loss in dB and efficiency at the given frequencies. The return loss 51 is illustratively reduced near the GPS and WiFi frequency bands, i.e. 1.575 GHz and 2.4 GHz, respectively. The efficiency at the GPS frequency band 52 illustratively about 24%. The efficiency at the WiFi frequency band 53 is illustratively between about 49-52%.

Figure 6:
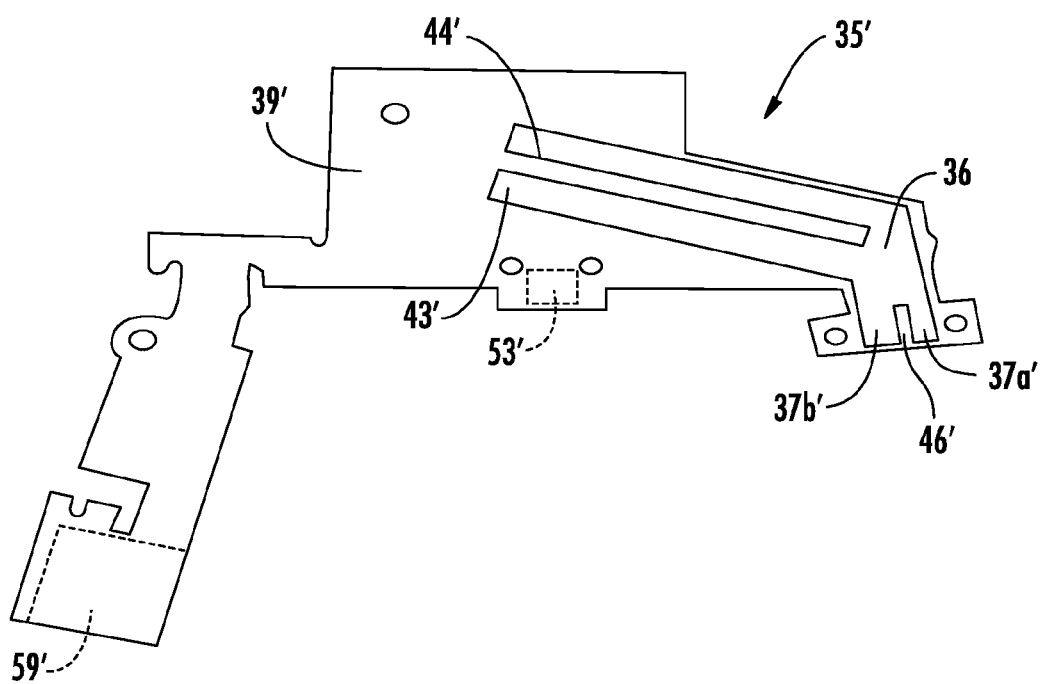
FIG. 6 is a schematic diagram of a flexible substrate and an antenna assembly in accordance with another example embodiment.

Referring now to FIG. 6, in another example embodiment, the antenna assembly 35' may be carried by a flexible dielectric substrate 39'. The antenna assembly 35' may be a printed pattern on the flexible dielectric substrate 39', or may be implemented thereon by other selective plating technologies, for example, laser direct structuring (LDS) or 2-shot molding.

The flexible dielectric substrate 39' may be included with another PCB (not shown), for example, the device PCB, for carrying other components or circuitry, for example, the controller 38', the display 60', the wireless transceiver 33', and the satellite positioning signal receiver 34'. The flexible dielectric substrate 39' may advantageously allow for conforming of the antenna assembly 35' with the back of the portable housing 31'. The flexible substrate 39' may include an adhesive layer (not shown), for example, a pressure sensitive adhesive, on an underside thereof to mount with the mobile wireless communications device 30'. A copper layer (not shown) may be carried on a front side of the flexible substrate 39'.

Additional circuitry may be carried by the flexible substrate 39'. For example, a microphone (not shown) may be carried by the flexible substrate 39'. A camera flash 59' may also be carried by the flexible substrate 39' adjacent ends of the first and second conductor arms 43', 44' opposite the base electrical conductor 36'. A switch circuit 53' may also be carried by the flexible substrate 39'. Other or different electronic components may be carried by the flexible substrate 39'.

The first and second conductor arms 43', 44' are illustratively are spaced apart, parallel, and extend outwardly from the base electrical conductor 36'. The first and second conductor arms 43', 44' are angled with respect to the base electrical conductor slot 46'. Illustratively, the first and second conductor arms 43', 44' are at an angle greater than ninety degrees with respect to the base electrical conductor slot 46'. In other words, the first and second conductor arms 43', 44' define an L-shape, or more particularly, a lazy L-shape, with respect to the base electrical conductor slot 46'. Of course, the first and second conductors 43', 44' may be at any angle with respect to the base electrical conductor slot 46' or may be at no angle at all, i.e. zero degrees.

Figure 7A:
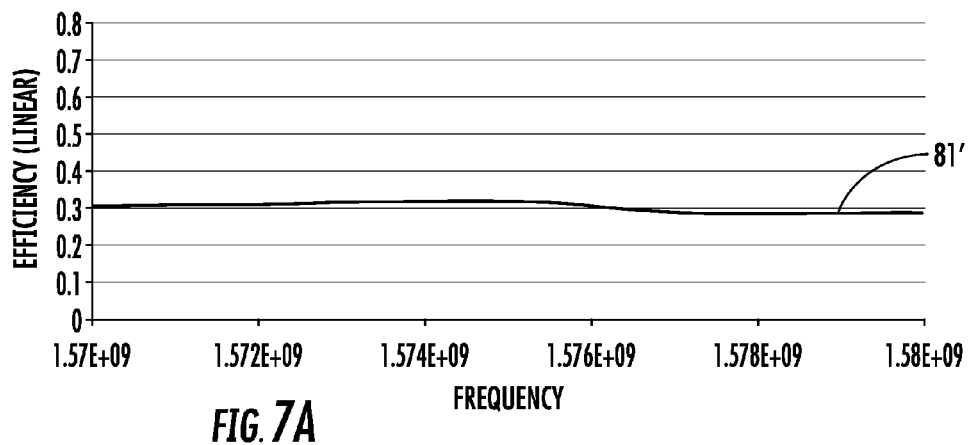
FIG. 7a is a graph of measured efficiency in the global positioning system frequency band for an antenna assembly similar to FIG. 6.

Referring now to the graph in FIG. 7*a*, the measured GPS efficiency in free space of an antenna assembly similar to that illustrated in FIG. 6 is illustrated. The linear efficiency 81 is about 32% across the GPS frequency band.

Figure 7B:
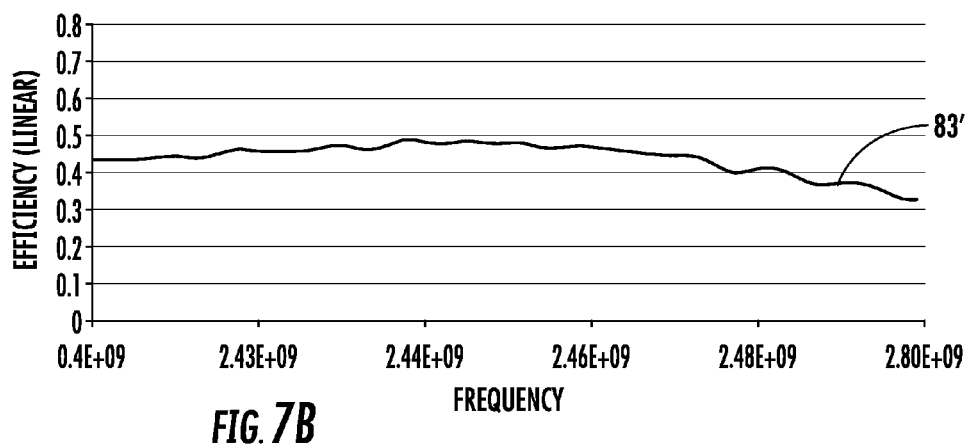
FIG. 7b is a graph of measured efficiency in the wireless local area network frequency band for an antenna assembly similar to FIG. 6.

Referring now to the graph in FIG. 7*b*, the measured WiFi efficiency in free space of the antenna assembly similar to that illustrated in FIG. 6 is illustrated. The linear efficiency 83 is about 40-49% across the WLAN frequency band.

Figure 7C:
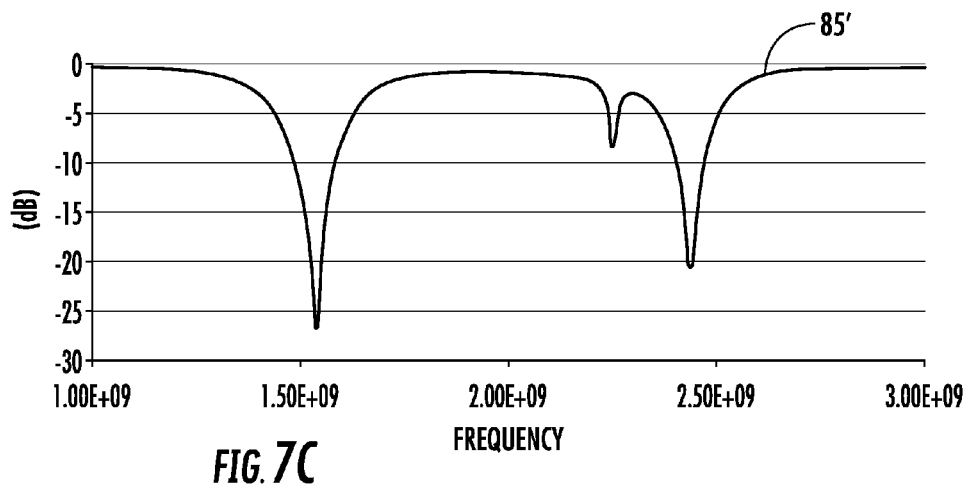
FIG. 7c is a graph of measured S parameters for an antenna assembly similar to FIG. 6.

Referring now to the graph in FIG. 7*c*, the measured S parameters in free space of the antenna assembly similar to that illustrated in FIG. 6 is illustrated. The return loss 85 in dB is reduced in the 1.49-1.59 GHz frequency band (i.e. GPS), and 2.37-2.5 GHz frequency band (i.e. WLAN).

The dual band functionality of the antenna assembly 35 may be particularly useful in the design of a mobile wireless communications device, for example, the mobile wireless communications device 30. The antenna assembly 35 advantageously reduces space occupied in the housing 31 and cost as compared to using two individual antennas, for example. Indeed, while the size of the antenna assembly 35 may be reduced, the performance of the antenna assembly may be maintained, for example, to support requirements of different wireless service carriers.

A method aspect is directed to a method of making an antenna assembly 35 for a mobile wireless communications device 30 that includes a portable housing 31, a wireless transceiver 33 carried by the portable housing, and a satellite positioning signal receiver 34 carried by the portable housing. The method includes forming a base electrical conductor 36 to have a pair of antenna feed points 37*a*, 37*b* and to be coupled to the wireless transceiver 33, and the satellite positioning signal receiver 34. The method also includes forming first and second parallel conductor arms 43, 44 to be spaced apart, parallel, and extend outwardly from the base electrical conductor 36.

Another method aspect is directed to a method of forming a mobile wireless communications device 30 including a portable housing 31, a wireless transceiver 33 carried by the portable housing, and an antenna assembly 35 carried by the portable housing. The method includes forming a base electrical conductor 36 having a slot 46 therein defining pair of antenna feed points 37*a*, 37*b* and coupled to the wireless transceiver 33. The method also includes forming first and second conductor arms 43, 44 being spaced apart, parallel, and extending outwardly from the base electrical conductor 36. The first and second conductor arms 43, 44 are angled with respect to the slot 46.

Example components of a mobile wireless communications device 1000 that may be used in accordance with the above-described embodiments are further described below with reference to FIG. 8. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 8:
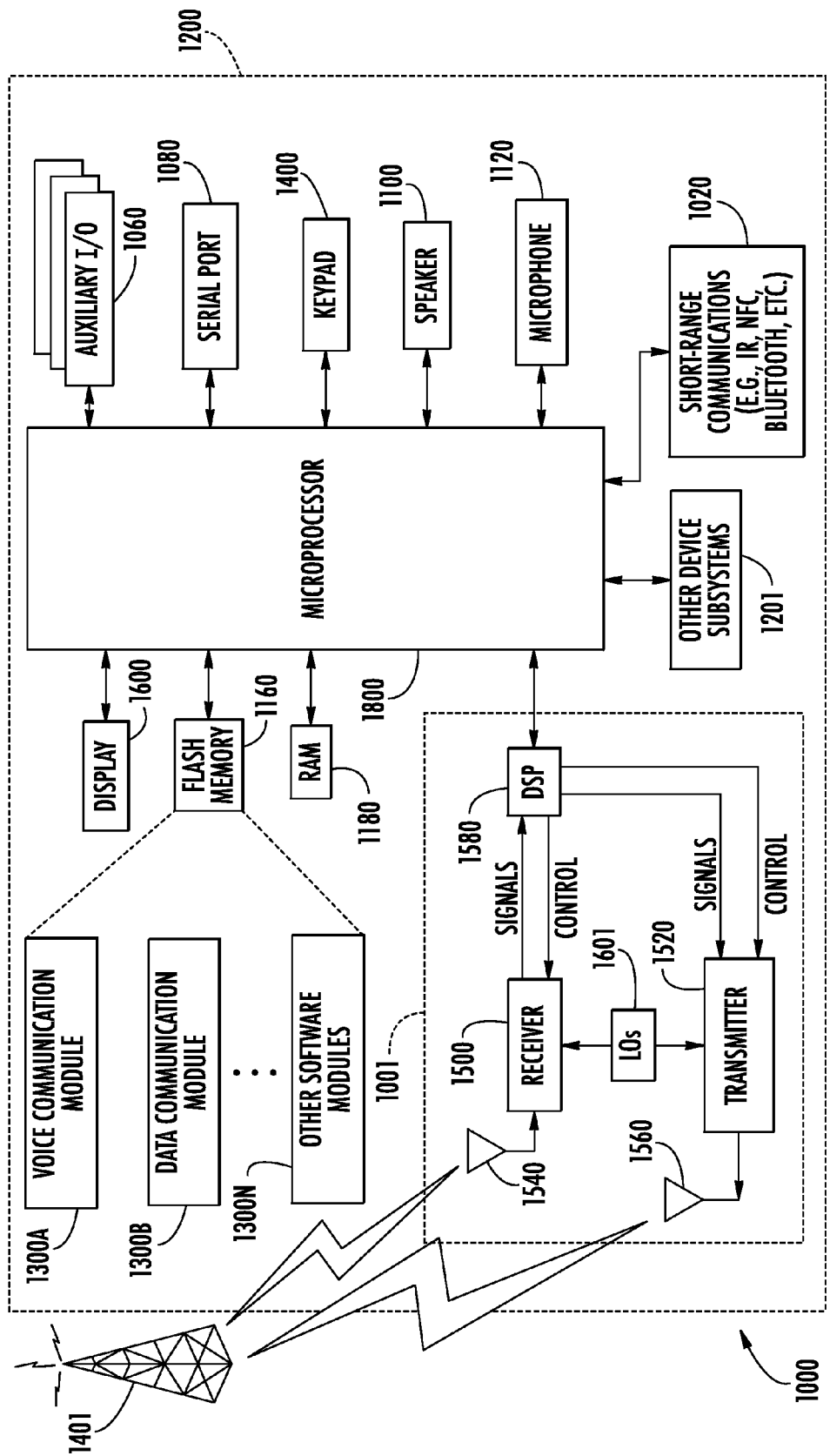
FIG. 8 is a schematic block diagram illustrating additional components that may be included in the mobile wireless communications device of FIG. 1.

In addition to the processing device 1800, other parts of the mobile device 1000 are shown schematically in FIG. 8. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
   a portable housing;
   at least one wireless transceiver carried by said portable housing;
   at least one satellite positioning signal receiver carried by said portable housing; and
   an antenna assembly carried by said portable housing and comprising
      a base electrical conductor having a pair of antenna feed points defined therein and coupled to said at least one wireless transceiver and said at least one satellite signal positioning receiver, and
      first and second conductor arms being spaced apart, parallel, and extending outwardly from said base electrical conductor and being coupled to said base electrical conductor.

2. The mobile wireless communications device according to claim 1, wherein said antenna assembly further comprises a dielectric substrate supporting said base electrical conductor and said first and second conductor arms.

3. The mobile wireless communications device according to claim 2, wherein said dielectric substrate comprises a flexible dielectric substrate.

4. The mobile wireless communications device according to claim 2, further comprising at least one electronic component carried by said dielectric substrate.

5. The mobile wireless communications device according to claim 1, wherein said first and second conductor arms each has a same length.

6. The mobile wireless communications device according to claim 1, wherein said first and second conductor arms have a rectangular shape.

7. The mobile wireless communications device according to claim 1, wherein the pair of antenna feed points comprises a pair of shorted antenna feed points.

8. The mobile wireless communications device according to claim 1, further comprising an impedance matching circuit carried by said housing and coupled to said antenna assembly.

9. The mobile wireless communications device according to claim 1, wherein said antenna assembly is configured to operate in at least one of a global positioning system (GPS) band, a wireless local area network (WLAN) band, and a personal area network (PAN) band.

10. A mobile wireless communications device comprising:
    a portable housing;
    at least one wireless transceiver carried by said portable housing; and
    an antenna assembly carried by said portable housing and comprising a base electrical conductor having a slot therein defining pair of antenna feed points and coupled to said at least one wireless transceiver, and first and second conductor arms being spaced apart, parallel, and extending outwardly from said base electrical conductor and being coupled to said base electrical conductor, said first and second conductor arms being angled with respect to the slot.

11. The mobile wireless communications device according to claim 10, wherein said antenna assembly further comprises a dielectric substrate supporting said base electrical conductor and said first and second conductor arms.

12. The mobile wireless communications device according to claim 11, wherein said dielectric substrate comprises a flexible dielectric substrate.

13. The mobile wireless communications device according to claim 11, further comprising at least one electronic component carried by said dielectric substrate.

14. The mobile wireless communications device according to claim 10, wherein said first and second conductor arms each has a same length.

15. The mobile wireless communications device according to claim 10, wherein the pair of antenna feed points comprises a pair of shorted antenna feed points.

16. A method of making an antenna assembly for a mobile wireless communications device comprising a portable housing, at least one wireless transceiver carried by the portable housing, and at least one satellite positioning signal receiver carried by the portable housing, the method comprising:

forming a base electrical conductor having a pair of antenna feed points and to be coupled to the at least one wireless transceiver, and the at least one satellite positioning signal receiver; and forming first and second parallel conductor arms being spaced apart, parallel, and extending outwardly from the base electrical conductor and being coupled to said base electrical conductor.

17. The method according to claim 16, further comprising forming the base electrical conductor and the first and second conductor arms on a dielectric substrate.

18. The method according to claim 17, wherein the dielectric substrate comprises a flexible dielectric substrate.

19. A method of forming a mobile wireless communications device comprising a portable housing, at least one wireless transceiver carried by the portable housing, and an antenna assembly carried by the portable housing, the method comprising:

forming a base electrical conductor having a slot therein defining pair of antenna feed points and coupled to the at least one wireless transceiver; and forming first and second conductor arms being spaced apart, parallel, and extending outwardly from the base electrical conductor and being coupled to said base electrical conductor, the first and second conductor arms being angled with respect to the slot.

20. The method according to claim 19, further comprising forming the base electrical conductor and the first and second conductor arms on a dielectric substrate.

21. The method according to claim 20, wherein the dielectric substrate comprises a flexible dielectric substrate.

* * * * *